United States Patent
Shepsis et al.

(10) Patent No.: US 10,253,747 B2
(45) Date of Patent: Apr. 9, 2019

(54) ENERGY GENERATION FROM WATER WAVES AND STORAGE OF ENERGY

(71) Applicants: Vladimir Shepsis, Edmonds, WA (US); Leo Shepsis, Portland, OR (US); Aleksandra Shepsis, Lynnwood, WA (US)

(72) Inventors: Vladimir Shepsis, Edmonds, WA (US); Leo Shepsis, Portland, OR (US); Aleksandra Shepsis, Lynnwood, WA (US)

(*) Notice: Subject to any disclaimer, the term of this patent is extended or adjusted under 35 U.S.C. 154(b) by 0 days.

(21) Appl. No.: 16/112,681

(22) Filed: Aug. 25, 2018

(65) Prior Publication Data

US 2019/0003448 A1     Jan. 3, 2019

Related U.S. Application Data

(60) Provisional application No. 62/554,096, filed on Sep. 5, 2017.

(51) Int. Cl.
| | | |
|---|---|---|
| C25B 1/04 | (2006.01) | |
| H02K 7/18 | (2006.01) | |
| F03B 13/14 | (2006.01) | |
| F03B 13/20 | (2006.01) | |

(52) U.S. Cl.
CPC ............... *F03B 13/14* (2013.01); *C25B 1/04* (2013.01); *F03B 13/20* (2013.01); *H02K 7/1853* (2013.01)

(58) Field of Classification Search
CPC ............ F03B 13/14–13/20; H02K 7/1853
USPC .................................................. 290/42, 53
See application file for complete search history.

(56) References Cited

U.S. PATENT DOCUMENTS

| | | |
|---|---|---|
| 3,204,110 A | 8/1965 | Masuda |
| 3,783,302 A | 1/1974 | Woodbridge |
| 3,965,364 A | 6/1976 | Gustafson et al. |
| 4,122,676 A | 10/1978 | Kikut |
| 4,141,670 A | 2/1979 | Russell |
| 4,145,882 A | 3/1979 | Thorsheim |
| 4,172,689 A | 10/1979 | Thorsheim |
| 4,260,901 A | 4/1981 | Woodbridge |

(Continued)

OTHER PUBLICATIONS

US Dept. of the Interior, "Wave Energy Potential on the U.S. Outer Continental Shelf," https://www.boem.gov/Wave-Energy-White-Paper-2006/ (Year: 2006).*

(Continued)

*Primary Examiner* — Nicholas A Smith
(74) *Attorney, Agent, or Firm* — Stan Sastry; Stan Sastry Law Office (57) ABSTRACT

Disclosed is a system and method for generating and storing energy from water waves. Oscillatory motions of a floating base are transmitted to adjustable weights enclosed in a container suspended from a frame that is rigidly installed inside the floating base. The container is operably coupled to a sheave, via a crank. The movement of the adjustable weights in the container results in the movement of a sheave that is operably coupled to an output shaft that is in turn coupled to an electric generator via a network of gears. The generator supplies power to an electrolyzer producing hydrogen and oxygen from water. The hydrogen and oxygen are compressed into gas or liquid and stored in containers on-board the floating base, until they are off-loaded at a facility.

20 Claims, 7 Drawing Sheets

(56) References Cited

U.S. PATENT DOCUMENTS

| | | |
|---|---|---|
| 4,274,010 A | 6/1981 | Lawson-Tancred |
| 4,296,602 A | 10/1981 | Hales et al. |
| 4,352,023 A | 9/1982 | Sachs et al. |
| 4,423,334 A | 12/1983 | Jacobi et al. |
| 4,443,708 A | 4/1984 | Lapeyre |
| 4,622,471 A | 11/1986 | Schroeder |
| 4,718,231 A | 1/1988 | Vides |
| 4,748,338 A | 5/1988 | Boyce |
| 4,773,221 A | 9/1988 | Noren |
| 5,052,902 A | 10/1991 | Labrador |
| 5,066,867 A | 11/1991 | Shim |
| 6,647,716 B2 | 11/2003 | Boyd |
| 6,711,897 B2 | 3/2004 | Lee |
| 7,245,041 B1 | 7/2007 | Olson |
| 7,319,278 B2 | 1/2008 | Gehring |
| 7,323,790 B2 | 1/2008 | Taylor et al. |
| 7,420,287 B2 | 9/2008 | Smushkovich |
| 7,791,213 B2 | 9/2010 | Patterson |
| 7,808,120 B2 | 10/2010 | Smith |
| 7,862,292 B2 | 1/2011 | Patterson |
| 7,946,113 B1 | 5/2011 | Bishop |
| 8,004,105 B2 | 8/2011 | Whittaker et al. |
| 8,035,243 B1 | 10/2011 | Mesa |
| 8,193,651 B2 | 6/2012 | Lightfoot et al. |
| 8,334,611 B2 | 12/2012 | Shreider et al. |
| 8,640,460 B2 | 2/2014 | Caspers |
| 8,686,583 B2 | 4/2014 | Bender |
| 8,973,359 B2 | 3/2015 | Chan |
| 9,018,779 B2 | 4/2015 | Yemm et al. |
| 9,151,266 B2 | 10/2015 | Bulaclac, Jr. |
| 9,447,770 B2 | 9/2016 | Paakkinen et al. |
| 10,006,434 B1 | 6/2018 | Peed |
| 2007/0154263 A1 | 7/2007 | Morrison |
| 2007/0228736 A1 | 10/2007 | Smushkovich |
| 2007/0273156 A1* | 11/2007 | Miyajima ............... F03B 13/20 290/53 |
| 2009/0115192 A1 | 5/2009 | Morrison |
| 2011/0113771 A1* | 5/2011 | Foster .................. F03B 13/189 60/501 |
| 2011/0121572 A1 | 5/2011 | Levchets et al. |
| 2012/0096847 A1 | 4/2012 | Boyd et al. |
| 2014/0132003 A1* | 5/2014 | Hayashi ................. F03B 13/20 290/53 |

OTHER PUBLICATIONS

Aurélien Babarit, Alain Clément, Jacques Ruer, Catherine Tartivel, SEAREV : A Fully Integrated Wave Energy Converter, Proceedings of the OWEMES (2006). (Year: 2006).*

\* cited by examiner

ENERGY GENERATION FROM WATER WAVES AND STORAGE OF ENERGY

RELATED APPLICATION DATA

This application claims benefit of Provisional U.S. Application No. 62/554,096 filed Sep. 5, 2017, which is incorporated herein by reference.

FIELD OF TECHNOLOGY

This disclosure relates to the conversion of ocean wave energy to renewable electrical energy, specifically, using the undulatory motions of ocean waves to generate electrical power that in turn may be harnessed to electrolyze water into compressed hydrogen for later use.

BACKGROUND

Commercial electricity is produced by steam-driven turbines. The steam is produced from burning fossil fuels or through nuclear fusion reactors or by building dams across rivers to drive hydro turbines. All of these power-generating activities, come with a heavy environmental toll and with massive climate changing consequences. One better way to generate clean electrical power is from the perpetual undulatory motions of oceanic water waves. Oceanic water waves are virtually an inexhaustible source of clean energy. Numerous devices that convert water wave energy into electrical power have been described in the prior art. However, only a limited number of these devices have been put into practice under real conditions. A review of prior art water wave energy devices shows that many of the prior art water wave energy devices (E.g., U.S. Pat. Nos. 4,443,708 and 9,018,779 are not capable of storing extracted water wave energy, but only convey unstored extracted water wave energy into a power grid on land. However, because of random variability in sea state conditions, the amount of water wave energy that may be transmitted to a land-based power grid varies significantly during any year and cannot be predicted or controlled. At the same time, a demand on energy at a land-based power grid is also highly randomly variable. For instance, it is possible that peak electrical energy production from water wave kinetic energy devices may occur at times of low electrical energy demand for land-based power grids. High demand for energy during the summer months may coincide with the low tide season and smaller tidal wave availability at sea. Conversely, low demand on land-based power grids may coincide with higher energy production due to higher tidal water wave frequency at sea. Thus, it is likely that peak energy demand at land-based power grids may not coincide with peak energy production by prior art water wave energy devices. Another limitation of certain prior art devices is that, because of an incapability to store the produced energy, the efficiency of some prior art water wave energy devices may be relatively low. In addition, storing energy on site at sea may be advantageous for oceanic shipping lanes wherefrom ships may refuel on high seas without having to make an end-run for energy refueling to the nearest port of call or other land-based energy sources, thus facilitating at sea refueling and obviating the need for a port call.

U.S. Pat. No. 8,193,651 issued to Lightfoot, et al., discloses a method of storage of extracted water wave energy in the form of hydrogen. This method includes extraction of ocean water wave energy at or near shore area and applies the energy to electrolyze ocean water to produce hydrogen gas from ocean water. The hydrogen gas is further pumped onshore for land-based storage. The disadvantage of such a storage method is that the water wave energy converter, generator, and electrolyzer are located at a near shore area (at the area of water wave impact), while storage for hydrogen gas is located on land. Thus, in order to store the extracted water wave energy, the hydrogen produced by an electrolyzer needs to be transported on land through a system of pipelines across the near shore area.

Prior art teaches that near shore areas are subject to impact by breaking water waves. Larger and more frequent water waves result in more violent conditions of breaking water waves at near shore area with consequential damages to shoreline and all facilities, including electrical facilities at near shore areas. Since the method in U.S. Pat. No. 8,193,651 relies on large water waves at near shore zone to produce water wave energy, violent breaking water wave conditions may be expected to disrupt installations as disclosed in prior art U.S. Pat. No. 8,193,651, including converter and hydrogen pipelines at these near shore areas. Significant capital investment and frequent maintenance work would then be required to maintain prior art systems of pipelines in operable condition. The advantage of the instant disclosure is that all constituents of the disclosed system, including energy converter, energy generator, water electrolyzer, compressor, storage facilities etc., are installed on a single off-shore floating platform base.

The prior art water wave energy devices (U.S. Pat. Nos. 4,443,708, 8,193,651, and 9,018,779) were developed to transmit extracted water wave energy into a power grid that is located on land via connecting power lines. Therefore, the prior art devices need to be located in close proximity to the land on near shore areas.

The following problems are associated with near shore land-based power grid installations tethered to offshore water wave energy extraction systems. Any commercial installation at a near shore coastal area would be subject to environmental legislative regulations which include complicated and lengthy permits and licenses. If permitted, the commercial installation would also require disaster mitigation measures that would significantly increase installation and maintenance costs.

Most prior art water wave energy devices are based on one of two concepts for extracting energy from water waves: (1) floating device or parts thereof on water waves: E.g., U.S. Pat. Nos. 5,066,867, 7,245,041, 7,319,278, US PG PUB. Nos. 20120096847, 20110121572, 20090115192; or (2) moving water waves through a device or parts thereof: E.g., U.S. Pat. Nos. 3,783,302; 4,260,901, 4,443,708; 4,622,471. Due to salt water-induced corrosion, clogging by oceanic flora and fauna, and floating debris, the water wave energy devices of either of these two types are subject to extensive wear and tear and malfunction. This wear and tear diminishes the efficient functioning of prior art device by reducing efficiency of energy production and requiring extensive maintenance work, thus increasing the overall cost of energy production.

Some prior art devices may provide efficient extraction of water wave energy only at certain sea state conditions characterized by water wave height, water wave frequencies, water wave length and water wave periodicity. For example, the device in U.S. Pat. No. 9,018,779 was adapted to suit a specific site with a specific water wavelength expected at that specific site. Furthermore, the length of individual members of this device is determined by the expected water wavelength at a specific site. This means that when water wave lengths differ from water wave lengths specified in the prior art device location site, the device may perform at suboptimal levels for extracting energy from water waves or the prior art device does not perform at all. It is common knowledge that sea state conditions randomly vary over time. Thus, there is a high probability that the prior art device may not perform at acceptable levels when power demands are high. For example, two prior art devices are discussed below: (1) U.S. Pat. No. 8,193,651: Method and Apparatus for Ocean Energy Conversion, Storage and Transportation to Shore; and (2) U.S. Pat. No. 8,973,359: Floating Wave Powered generator.

(1) U.S. Pat. No. 8,193,651: Method and Apparatus for Ocean Energy Conversion, Storage, and Transportation to Shore. The apparatus is comprised of a fleet of vessels attached together in longitudinal and transversal directions by special attachment mechanisms. These attachment mechanisms allow roll, pitch, and heave movements of each element (individual vessel) of the fleet. The attachment mechanism includes a hydraulic cylinder located midway between the attached vessels in a way that any relative movement between the individual vessels will extend or retract the piston in the hydraulic cylinder, which will result in pressurized flow of the working fluid from which energy can be harvested. The fleet of vessels, once attached together and affected by water waves, converts water wave energy to electrical energy, which is stored in chemical form, one of which is liquified hydrogen that is stored in special tanks. When detached from the fleet, the vessels provide transportation of chemical product (from storage of energy) to coastal waterway or by navigable waterway ports of call for distribution to market centers. To effectively perform (i.e., extract water wave energy) for a wide range of sea state conditions, the system may be adjusted by altering the composition of the fleet (number and type of vessels in assembly, direction of assembly, and ballasting the vessels). There are at least two possible issues with this prototype that reduces performance efficiency and/or limits its application:

Prior art problem 1: Irregularity of ocean water waves. Ocean water waves are an irregular system of water waves of different heights, periods, and directions. Due to this irregularity, it is likely that adjacent vessels in the assembly are moving at different amplitude and phasing, resulting in inefficiency of the invented hydraulic system to extract water wave energy.

Prior art problem 2: Forces in mooring lines and anchoring system. Kinetic energy of the movable assembly (fleet) generates significant forces in the mooring lines and anchors. In order to hold such a fleet of vessels in assembly, the mooring lines must be long and heavy. As result, the motions of moored vessels in the assembly may be absorbed and modified by the mooring lines. The restricting and controlling forces of the mooring line may generate a domino effect for motions of other vessels in the assembly and dampen the natural ebb and flow of water waves, resulting in inefficiency of extracting water wave energy, as well as enormous forces on connecting devices.

(2) U.S. Pat. No. 8,973,359: The Floating Wave Powered Generator. This device includes a floating vessel with onboard pendulum mechanism, mounted on the lever arm above a platform deck of the vessel, and a power-generating mechanism driven by a gear mechanism. Because of the undulating water waves, the pendulum, being mounted on the lever arm, sways laterally around an axis of the upstanding post, causing the upstanding post to rotate, hence delivering the momentum of the pendulum to drive the power-generating mechanism via a transmission shaft and the gear mechanism. There are at least two issues with this device. In addition, the same issues discussed above for U.S. Pat. No. 8,193,651 may apply to the floating device in U.S. Pat. No. 8,973,359, which may reduce performance efficiency and limit its application: The two issues that are more specific to the device in U.S. Pat. No. 8,973,359 are as follows:

Prior art problem related to the stability of the ship Issue 1: Lateral motions of pendulum exacerbate rolling movements of the vessel, which may endanger safety conditions of vessel. To avoid risk of safety of the vessel this device would be able to perform only during mild sea state conditions; thus, application of the device is quite limited.

Prior art problem related to the variability of sea state conditions Issue 2: Amplitude and frequency of pendulum motion is a function of frequency and amplitude of vessel motion, which in turn is a function of sea state conditions (direction, period, and height of ocean water waves). There is apparently a certain narrow band width of the sea state parameters that activate motions of pendulum and, if activated, provides frequency and amplitude corresponding to optimal performance of the device. However, because of a wide spectrum of sea state conditions, it is likely the device may be working inefficiently (or may function at all) for a significant period of time.

Another example of a limited ability to extract wave energy by prior art devices is the device in non-patent publication "The SEAREV wave energy converter" (Publication of the 6th European Wave and Tidal Energy Conference Glasgow, UK, Aug. 29-Sep. 2, 2005). SEAREV is a floating device uses a cylinder that behaves mechanically like a pendulum. The rotational motion of this pendulum wheel relative to the floating hull of the device activates an electric generator. The study referenced above shows that SEAREV optimally performs only in a relatively narrow bandwidth of water wave period, between 3 to 8 seconds. However, considering that ocean water wave periods vary in a range between 3 to 20 seconds and wider, it is likely that SEAREV, if installed in the ocean would not perform optimally during a significant period of time. Hence there is wide range of unabsorbed wave energy in the wider scale of the periods 8-20 seconds.

Thus, given the limitations of prior art devices, there is need for a new type of device that can potentially surmount the above prior art limitations and problems associated to prior art devices.

SUMMARY

System, apparatus and method for extracting energy from water wave motions, particularly from ocean waves, and storage of energy therefrom in the form of compressed hydrogen are disclosed.

The disclosure includes an embodiment of an apparatus for converting water wave energy into usable electrical energy. The apparatus comprises: a floating base that floats on a surface of a large body of water having water waves. In an embodiment, the floating base moves upward and downward in response to the water waves. The floating base includes an upper surface that is configured and adapted to house more than one large unit of items and a lower surface that is configured and adapted to float on the large body of water without capsizing. The apparatus further includes a rigid stable frame that is substantially vertically disposed and firmly affixed on to the upper surface of the floating base. The apparatus includes a sheave that is substantially vertically operably coupled to a supporting horizontal member of the rigid stable frame, the sheave being configured to vertically rotate around an axis of rotation on a bearing. The apparatus further includes adjustable weights suspended from a horizontal supporting member of the rigid stable frame, the adjustable weights being enclosed in a container, the container being operably coupled to the horizontal supporting member of the rigid stable frame by a least one suspension spring that is capable of contracting and expanding vertically such that the adjustable weights enclosed in the container move up and down along a vertically positioned guide shaft that is affixed to the upper surface of the floating base. The sheave is connected to a crank. One end of the crank is operably coupled to the sheave. A second end of the crank is operably coupled to the adjustable weights container. Up and down movements of the adjustable weights container causes the crank to move, which in turn results in the rotation of the sheave. In an embodiment, the energy converter is enclosed in a housing in order to protect it from external elements. The apparatus has at least one output shaft that is connected at one end to the sheave and a second end of the at least one output shaft is operably coupled to at least one gear system such that rotations of the at least one output shaft are converted to generate power from an electric generator. The apparatus includes a reservoir containing fluid to replenish and deplete the adjustable weights in the container, if the adjustable weights include a fluid or grain, the fluid being pumped using at least one pump. The reservoir and the adjustable weights container are replenished or depleted through a system of pipes or hoses. In an embodiment the floating base floats on a large body that includes either an ocean, a sea, a river or a lake. In a different embodiment, the water waves of the large body of water will impact the floating base by physical collision of the water waves with the floating base resulting in an upward and downward movement of the adjustable weights in the container. The upward and downward movement of the adjustable weights in the container causes the sheave to rotate, which in turn causes the at least one output shaft to rotate through a network of gears. In an embodiment, the apparatus includes at least one suspension spring that may be a suspender, a gas piston-cylinder arrangement, a hydraulic piston-cylinder arrangement, a coil spring or a combination therefrom. In different embodiments, the adjustable weights may include a gravity plate, an electromagnetic plate, a granular material, a fluid or combinations therefrom. In an embodiment, at least one up or down movement of adjustable weights container results in a rotation of the sheave. Furthermore, the apparatus has at least one output shaft that is operably connected to at least one electric generator. In yet another embodiment, the apparatus has at least one output shaft is operably connected to a system of gears, which is operably connected to at least one electric generator. A further alternate embodiment includes, the apparatus having at least one output shaft that moves/rotates to effectively generate at least one unit of electrical energy.

An aspect of the disclosure includes a method of extracting energy from water waves, the method comprising the steps of: (1) locating a floating base within the confines of a large body of water; (2) adjusting and tuning at least one suspension spring, the at least one suspension spring being operably coupled to a plurality of adjustable weights in a container; (3) attaching one end of the at least one spring to one part of a horizontal supporting member of a rigid frame and attaching a second end of the at least one spring to the container having the adjustable weights; (4) transferring energy from undulatory floatation motions of the floating base into movements of the plurality of adjustable weights in the container; (5) converting a kinetic energy of the movements of the plurality of adjustable weights into electricity; (6) extracting a water wave energy using an energy converter; (7) generating electricity by operably converting a kinetic energy from a converter to an electric generator on-board the floating base; (8) supplying electricity to an electrolyzer on-board the floating base to generate molecular oxygen and hydrogen; (9) storing oxygen as compressed gas or liquified oxygen in compressed form in tanks; (10) storing hydrogen as compressed gas or liquified hydrogen in compressed form in tanks; (11) off-loading the oxygen and the hydrogen tanks and emptying the tanks to an appropriate receiving on-shore facility at a port of call; and (12) repeating the above steps as appropriate. In an embodiment of the method, at least one suspension spring is selected from a group consisting of a suspender, a gas shock absorber, a hydraulic piston-cylinder, a coil spring or a combination therefrom. In a further embodiment of the method, the adjustable weights are selected from a group consisting of a gravity plate, an electromagnetic plate, a grain, a fluid or a combination therefrom. In yet another embodiment, the method, the adjustable weights in the container that is operably coupled to the at least one suspension spring includes a suspension travel that is in response to a motion of the water waves.

A yet another aspect of the disclosure includes a system for generating energy from water waves and storage of the energy therefrom in a form of hydrogen. The system comprises: a floating base that is located within a confine of a large body of water, wherein the floating base houses at least one water wave energy converter, at least one electric generator, at least one DC to AC inverter; at least one electrolyzer, at least one compressor for compressing oxygen and hydrogen gases, and at least one storage tank to store compressed liquified hydrogen and oxygen. In an embodiment, the system includes at least one water wave energy converter that is operably connected by at least one output shaft to at least one electric generator that is operably coupled to a system of gears. In yet another embodiment, the system includes at least one electric generator that is operably connected to a system of electrical wires and cables to the at least one electrolyzer. In a further embodiment, the system comprises at least one electrolyzer that is operably connected by a system of electrical wires, cables, hoses and pipes to at least one compressor. In an alternate embodiment, the system includes at least one compressor that is operably connected by a system of electrical wires, cables, hoses and pipes to at least one storage tank for storing oxygen and hydrogen.

The foregoing summary is not intended to be in any way limiting. In addition to the illustrative aspects, further improved aspects, embodiments, and devices and methods will become apparent by reference to the drawings and the detailed description.

A person skilled in the art will recognize that the drawings and accompanying brief descriptions are illustrative without limitations and are not drawn to scale.

DETAILED DESCRIPTION

The following disclosure is drawn to an apparatus and system for harnessing the wave energy of seas and oceans and covert the kinetic energy of water waves into usable electrical power. An aspect includes using electrical energy derived from water wave motions to split sea water into molecular hydrogen and oxygen and storage of energy thereof.

In the following detailed description, reference is made to the accompanying drawings, which form a part and parcel thereof. The illustrative embodiments described in the detailed description, drawings and claims are not meant to be limiting in any way. Other embodiments may be utilized, and other changes may be made to the disclosure, without departing from the spirit, letter or scope of the subject matter presented here.

1. System Components:

Floating Base or Hull: Preferably the floating base is a transportation marine barge, floating platform, ship, or other devices that are adapted to be capable of housing either a single- or multiple-wave converters, generators, electrolyzers, compressors, and storage containers or tanks that can store compressed liquified hydrogen and oxygen. The floating base has no limitation on its dimensions, but shall meet ocean service certification requirements of the U.S. Coast Guard and American Bureau of Shipping (ABS) standards. Trade studies will determine whether future specialized performance requirements would justify new, and optimized hydrodynamic designs as opposed to existing commercial designs.

Wave Energy Converter: A water wave energy converter is comprised of a frame, installed inside a hull or on a deck of a floating base. In an embodiment, the converter includes a frame having adjustable suspension, adjustable (remove and replace) weights and/or electromagnetic plates, a crank, a sheave, a network system of gears, and output shaft. In an embodiment, the suspended weights are adapted to respond to water wave-induced motions of the floating base. In a further embodiment, the sheave, crank, and network system of gears, will transfer motions of the wave energy into rotation of an output shaft of the converter. In yet another embodiment, the converter is comprised of adjustable weights, or electromagnetic plate, or a combination of thereof, which move up and down in consonance with water wave-induced impact along a guide shaft. In an embodiment, adjustable weights include either gravity plates that can be adjusted by means of adding or removing individual plates, or weights made from a container having adjustable (reduced/increased) weights. An adjustable weight in a container may be optimized by means of filling or discharging water using a pump to control the amount of water in the container. Alternatively, a granular material may be introduced into the container from an on-board storage reservoir using a system of pipes or hoses to pump a granular material into the container. An embodiment includes an electromagnetic plate that induces a force perpendicular to the plate surface upon application of electromagnetic or magnetic fields. Electromagnetic plates for this application may be commercially available for purchase. An adjustable suspension is comprised of coil springs, gas/hydraulic piston-cylinder arrangements or air-enabling alteration of elasticity of suspension (shock absorbers or piston-cylinders) or any suitable combinations thereof. The suspension may be operably controlled in manner such that it is tuned to respond optimally to the up and down motions of ocean waves. The suspension may be tuned according to phasing, frequency, and amplitude variations of the oscillatory motions of ocean and/or sea water waves wherein the floating base may be located.

Electrical Generator: An electrical generator of the type in this disclosure is a commercially available device that converts rotational energy of the water wave energy converter's output shaft(s) into DC electric current. The electrical generator must be operably coupled to the wave energy converter and designed to be compatible with the specifications the wave energy converter.

Electrolyzer: Herein disclosed is an electrolyzer on-board the floating base. The electrolyzer uses the processes of electrolysis to split sea water into hydrogen and oxygen. A DC/AC inverter may be used to supply electricity from the on-board electric generator to the on-board electrolyzer. The electrolyzer may be commercially available and should be operably coupled to the on-board electrical generator and meet the specifications of a floating base. The electrolyzer should be designed to perform efficiently under the turbulent conditions of the floating base.

Hydrogen Compressor: An on-board hydrogen compressor may be a commercially available device that is designed to compress hydrogen gas manufactured by the electrolyzer. The compressed hydrogen gas may be liquified and pumped via additional pumping mechanisms to on-board hydrogen storage facilities.

Hydrogen Storage Facilities: Preferably, the on-board hydrogen storage facilities are comprised of single or multiple compartments located within the floating base or hull. Tanks or containers suitable for compressed hydrogen gas or liquified hydrogen are commercially available for purchase and may be installed on-board the floating base. The floating base is preferably equipped with devices and tools that may be used to safely off-load the tanks containing compressed hydrogen, when needed at a port of call.

Oxygen Compressor: Preferably, an on-board oxygen compressor is a commercially available device that will pressurize the oxygen gas produced from the electrolyzer. The Oxygen gas is volumetrically compressed or liquified. The compressed oxygen gas or liquid oxygen is further pumped into storage facilities located on-board the floating base.

Oxygen Storage Facilities: Preferably, oxygen storage facilities are comprised of single or multiple compartments located on-board the floating base or hull. Tanks or containers suitable for compressed oxygen gas or liquified oxygen are commercially available and may be installed on-board the floating base. The floating base is preferably equipped with devices and tools that may be used to safely off-load the tanks containing compressed oxygen, when needed at a port of call.

2 System Performance

Figure 1:
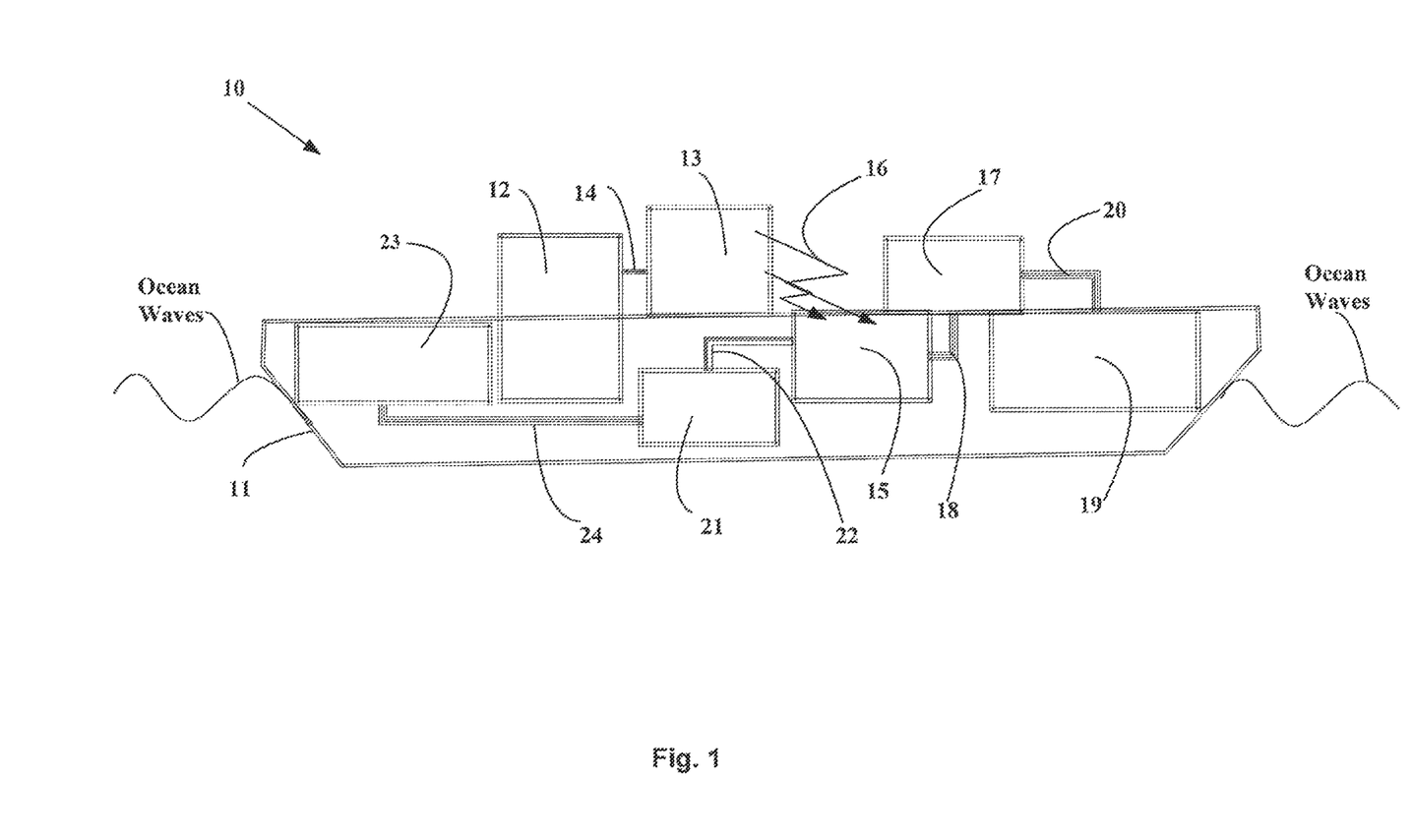
FIG. 1 is a system-level diagram of power generation and storage.

Referring now to FIG. 1, which illustrates a system 10 comprising at least one floating base 11 that is subjected to up and down movements due to the impact of ocean/sea waves. In an embodiment, the floating base includes, but is not limited to, a barge, a shipping hull, a raft, a bouy or any other buoyant body that is adapted to float on a large body of water such as an ocean or the high seas. The floating base is constructed to include one or more component units, each being enclosed in a protective housing shielding the units from the external elements. The floating base comprises, but is not limited to the following components: a wave energy converter 12 that is operably coupled to an electric generator 13 via a converter output shaft 14; an electrolyzer 15 that is supplied with electricity from the electric generator via an electric current from an DC/AC inverter 16; a hydrogen compressor 17 that is operably connected via pipelines 18 from the electrolyzer; a hydrogen storage compartment 19 for hydrogen gas that is operably connected to the hydrogen compressor via pipelines 20; an oxygen compressor 21 that is operably connected via pipelines 22 to the electrolyzer 15. The oxygen compressor sends compressed oxygen gas or liquid to storage compartment 23 via pipelines 24.

Figure 2:
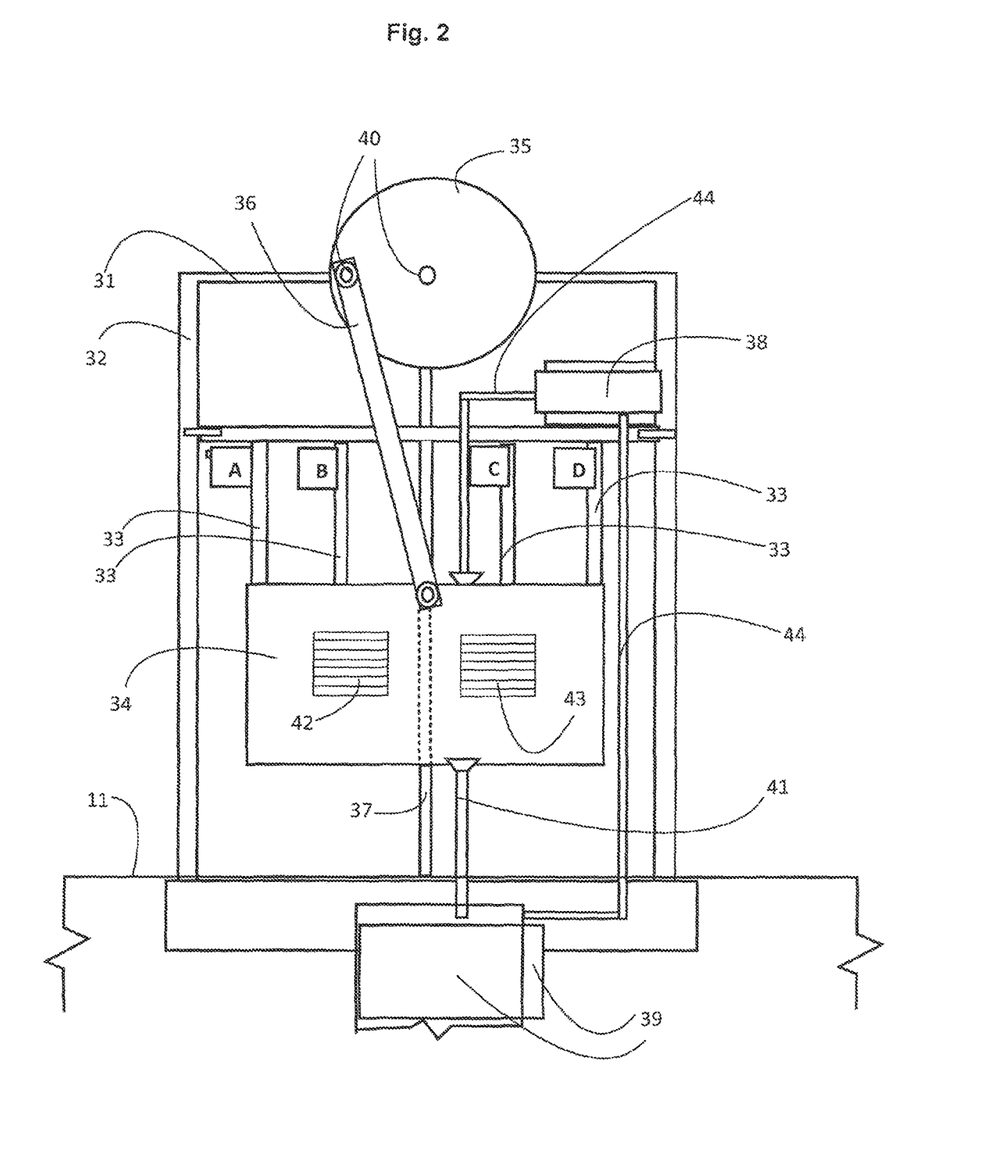
FIG. 2 is an illustrative front view of a wave energy converter.
Figure 3:
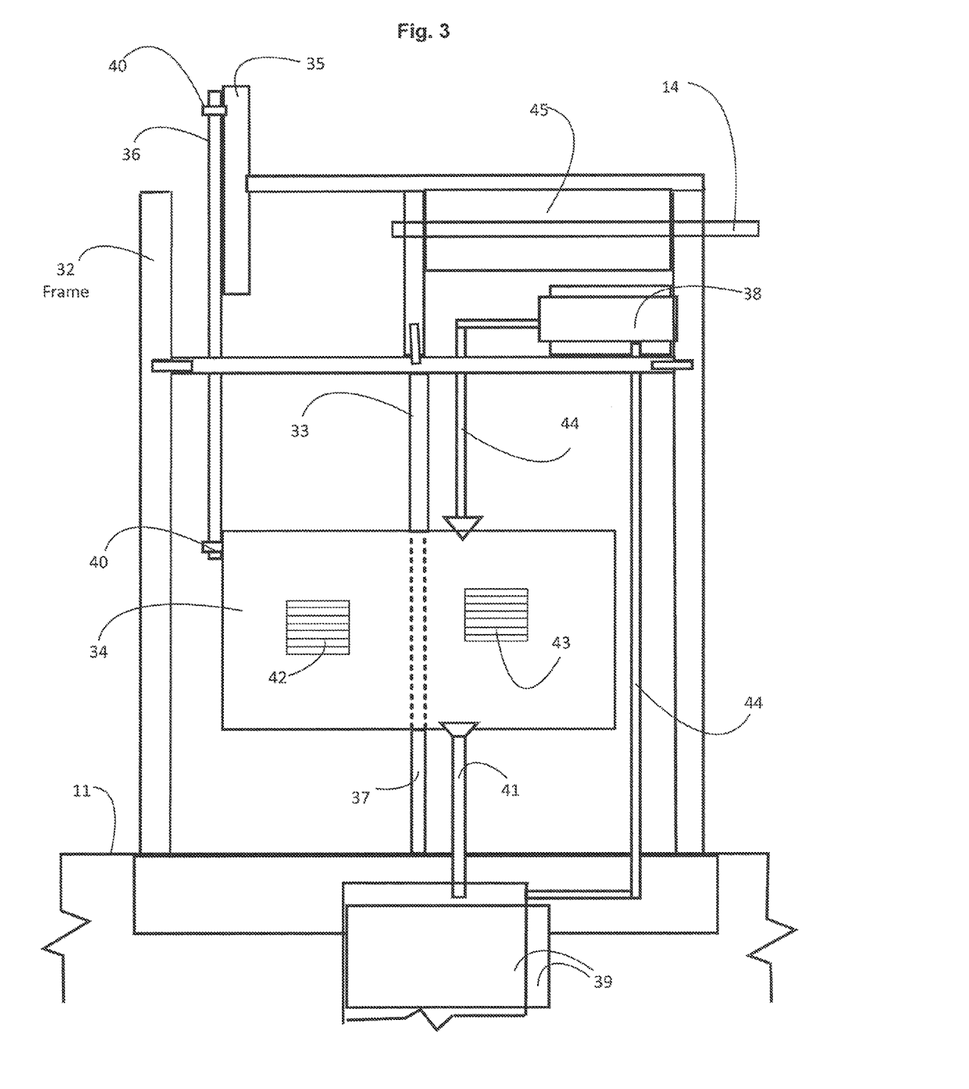
FIG. 3 is an illustrative side view of a wave energy converter.

FIG. 2 and FIG. 3 present illustrative front and side views, respectively, of the innards an embodiment of a wave energy converter that uses ocean wave kinetic energy to ultimately produce usable electricity. In an embodiment, the wave energy converter comprises a frame 32 that is rigid and stable but is subjected to water wave-induced undulatory motions including heave (vertical up and down) motions. The motions of the frame occur with frequency and amplitude, approximating the frequency and amplitude of incident water waves (Ocean waves, FIG. 1). The oscillatory motions of the floating base 11 and the frame 32 of the converter are transmitted to adjustable weights 42, 43, which are enclosed in a container 34. The adjustable weights container is suspended using suspension springs 33. In an embodiment, the adjustable weights may include, but are not limited to, gravity plates, dead weights, electromagnetic plates, granular materials, and/or fluids. In yet another embodiment, the tension of the springs may be adjustable depending on the nature of the adjustable weights and the extent of permissible suspension travel. The suspension springs may include, but are not limited to hydraulic or gas shock absorbers, coil springs, piston-cylinder type arrangements, suspenders and the like. Due to the elasticity of the adjustable suspension springs 33 there may be a lag time in their responsiveness to the motions of the adjustable weights container 34 relative to the timing of the motions of the floating base 11. In other words, the movement of the adjustable weights container may not be in perfect harmony with the undulatory motions of the floating base. This discordance may result in differences in phase, amplitude, and frequency variations of suspension travel of the springs 33, adjustable weights 42, 43 and container 34. The suspension springs may be of different types, e.g., coil springs, gas cylinder-piston arrangements, or hydraulic cylinder-piston arrangements, suspenders and/or combinations therefrom. For example, FIG. 2 illustratively shows multiple types of springs A, B, C, and D in the suspension. Adjustment of elasticity and suspension travel in this case may be achieved by proper application of combinations of different types of springs, e.g., pistons, gas, hydraulic cylinders, shock absorbers, dampeners and the like and/or combinations thereof, without limitations. In a different embodiment remote-controlled gas or fluid release systems may be used to augment the suspension travel. Other types of piston-driven suspensions may be employed including, but not limited to, gas or hydraulic devices capable of controlling suspension travel using external reservoirs of gas or fluids, providing controlled suspension travel. In an embodiment, there is a rotatable sheave 35 (flywheel) that rotates in response to the movement of the adjustable weights container 34, which moves in response to the water wave-induced motions of the floating base. In an embodiment, the sheave 35 may be substantially vertically disposed and is operably coupled to a horizontal supporting member 31 of the frame 32. The sheave is also operably coupled to the adjustable weights container 34 through a crank 36 using bearings 40. The adjustable weights container 34 moves up and down along a guide shaft 37. As illustrated in a side perspective view in FIG. 3, the rotational motions of the sheave 35 are translated using at least one system of gears 45 into rotations of the converter's at least one output shaft 14. The water wave energy converter's output shaft 14 is operably connected to an electric generator 13 (see FIG. 1), wherein mechanical energy from output shaft rotation is converted into electrical energy in the form of D.C. current.

In an alternative embodiment, the adjustable weights container may be replenished and supplied in a cyclical fashion from a holding reservoir 39 that contains liquid, grain or other solid material via supply pipes 44 using at least one pump 38. The adjustable weights container may be drained and replenished from the holding reservoir, when necessary, via an alternative pipe line 41.

There may be a phase difference between the movement of the floating base and the adjustable weights container. This phase differential may arise due to the asynchronous movement of the floating base, at any given time, relative to the movement of the adjustable weights container. For instance, at a given time, the floating base may be moving downwards (from crest to trough of a wave), while in comparison, the adjustable weights container may be moving upwards. Conversely, the floating base may be moving upward while at that time the adjustable weights container may be moving downward. The downward (or upward) movement of the adjustable weights container will be counteracted by opposing forces of the suspension springs. In an alternate embodiment, one or more electromagnetic plates may be used to create counter forces on the adjustable weights container. In this case the magnetic force of the electromagnetic plates may counter act to correct the phase difference. At any given instant, the gravitational force or electromagnetic force, as the case may be, counters the downward (or upward) movement of the adjustable weights container. The length of time from the instant when the adjustable weights container reverses its movement relative to the movement of the floating base or vice versa, defines the phase differential between movement of the floating base and movement of the adjustable weights container. For a given water wave frequency and amplitude, the phase differential is a function of the suspension travel of the adjustable weights container (or magnetic force of the electromagnetic plate). The phase differential can be corrected or altered by tweaking one or more elastic parameters of the springs, shock absorbers, and/or the mass distribution of the adjustable weights container, without limitations. In an alternative embodiment, the electromagnetic forces generated in the electromagnetic plates may be used to correct the phase differential. The amplitude and frequency of movement of the suspension springs and adjustable weights container or alternatively the electromagnetic plates may be tuned using Hooke's Law. Hooke's Law states that that the force needed to extend or compress a spring by some distance is proportional to that distance. Thus, by using the adjustable suspension springs with different suspension travel and adjustable weights as disclosed herein, the frequency and amplitude of the suspension springs may be tuned and adjusted to generate optimal power from the wave energy converter. Optimal power generation may be achieved through resonance oscillation of the adjustable weights container relative to the amplitude and frequency of the floating base. As discussed in the background section, random variability of sea state conditions may be a reason why prior art wave energy devices may perform poorly under certain range of water wave frequencies and amplitudes. The system disclosed herein solves the prior art problem by using adjustable suspension springs and/or adjustable weights and/or electromagnetic plates.

Figure 4:
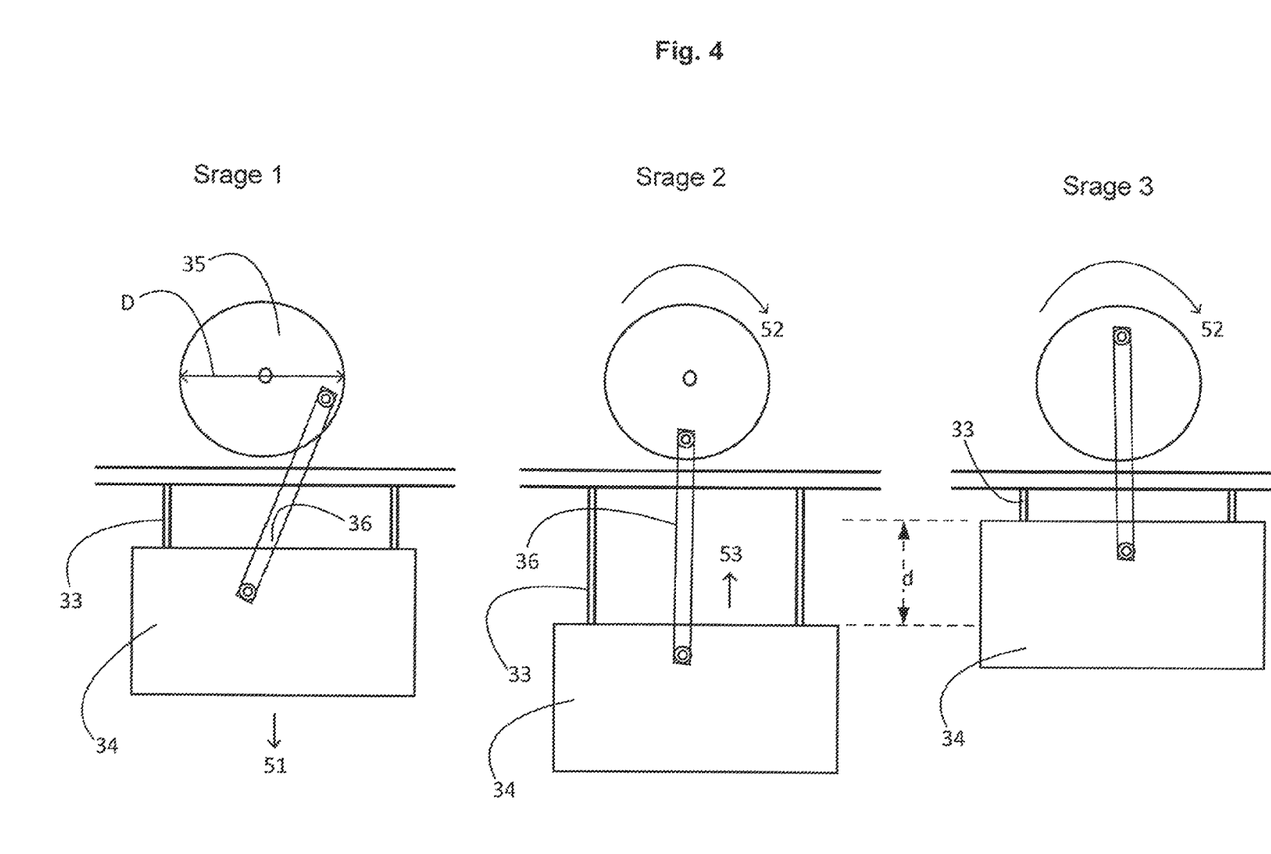
FIG. 4 is an illustration of rotation movements of sheave and corresponding suspension travel.

FIG. 4 illustrates three exemplary stages of articulation of suspension travel of the adjustable weights container 34, the suspension springs 33, the sheave 35, and the crank shaft 36. Stage 1: for example, a starting position that shows water wave-induced downward acceleration force 51 and downward movement of adjustable weights container. Stage 2: shows the sheave rotating 52 and the adjustable weights container's 34 suspension travel bottoming out with full extension of the springs 33. Then the adjustable weights container starts its upward trajectory 53. Stage 3 shows the adjustable weights container's 34 suspension travel topping out upward, with maximally compressed springs 33. The movement of the adjustable weights container articulates with the rotation 52 of the sheave 35 and the movement of the crank 36. Here, the maximum suspension travel (d) is governed by the expression: $d=\pi D/2$, where D is the diameter of the sheave.

An advantage of the instant apparatus relative to prior art wave energy devices is that by using adjustable weights and variable suspensions, the maximum suspension travel "d" may be adjusted according to the above expression ($d=\pi D/2$) for a wide range of heave motions of the floating base. In other words, the instantly disclosed apparatus has a high degree of flexibility and is adaptable to a wide spectrum of ocean wave amplitudes and frequencies, thus providing higher level of performance compared to prior art devices.

Figure 5:
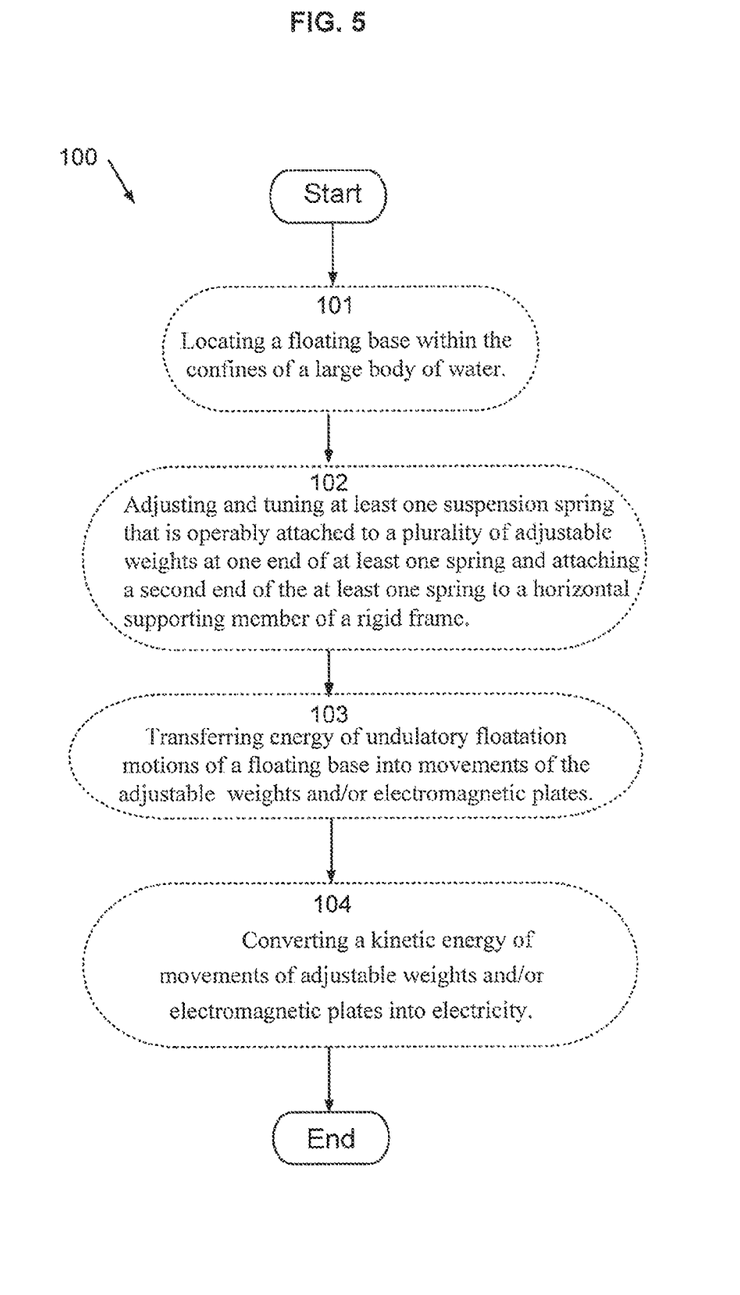
FIG. 5 is a flow chart of energy generation steps.

In FIG. 5, there is illustrated a schematic flow chart of a method 100 of extraction of energy from ocean water waves to produce electricity. The method comprises: a step 101 of locating a floating base within the confines of a large body of water; a step 102 of adjusting and tuning at least one suspension spring that is operably attached to a plurality of adjustable weights in a container that is attached at one end of at least one spring and attaching a second end of the at least one spring to a horizontal supporting member of a rigid frame; a step 103 of transferring energy of undulatory floatation motions of a floating base into movements of the adjustable weights and/or electromagnetic plates; and a step 104 converting a kinetic energy of movements of adjustable weights and/or electromagnetic plates into electricity.

3. Oxygen and Hydrogen Generation:

Returning now to FIG. 1, once the energy converter's 12 adjustable weights and suspension springs are optimally tuned to a given sea state condition, the up and down motions of the adjustable weights (and/or electromagnetic plates) will be converted to the rotational movements of the sheave in the energy converter 12. The kinetic energy from the movement of the adjustable weights is converted to the rotational energy of the output shaft 14, which is operably connected to the electric generator 13 to generate DC current. The DC current is then converted to AC current using a DC/AC power inverter. The electrical power 16 is then utilized by an electrolyzer 15 (FIG. 1) to electrolyze the ocean water to produce hydrogen and oxygen. The electrolytic process consists of passing electrical current through water at an appropriate voltage to effect decomposition of water according to the following overall chemical reaction:

$$2H_2O \rightarrow 2H_2 + O_2.$$

Hydrogen gas from the electrolyzer is collected and pumped to hydrogen compressor 17 through a pipeline 18. Compressed or liquified hydrogen is pumped to containers or tanks located in the hydrogen storage compartment 19 via pipelines 20. Oxygen gas from the electrolysis process is collected, compressed by the oxygen compressor 21, and pumped to tanks/containers located at the oxygen storage compartment 23 via pipelines 24. Alternatively, oxygen may be released into the atmosphere or bubbled into the ocean water. Once the hydrogen and oxygen storage facilities are filled up, the storage containers may be either towed to a nearby harbor for offloading or otherwise removed from the floating base 11. If the floating base has its own self-propelling power, it may visit a port of call/harbor for offloading the hydrogen and oxygen containers. Off-loading starts the next cycle of water wave energy generation and storage. Alternatively, the containers that are filled up with hydrogen and oxygen may be loaded and transported onshore by another transport vessel that will also bring empty tanks or tanks/containers filled up with water back to the floating base to be loaded with hydrogen and oxygen. In this manner, the process of water wave energy generation and storage may be conducted without interruption.

Figure 6:
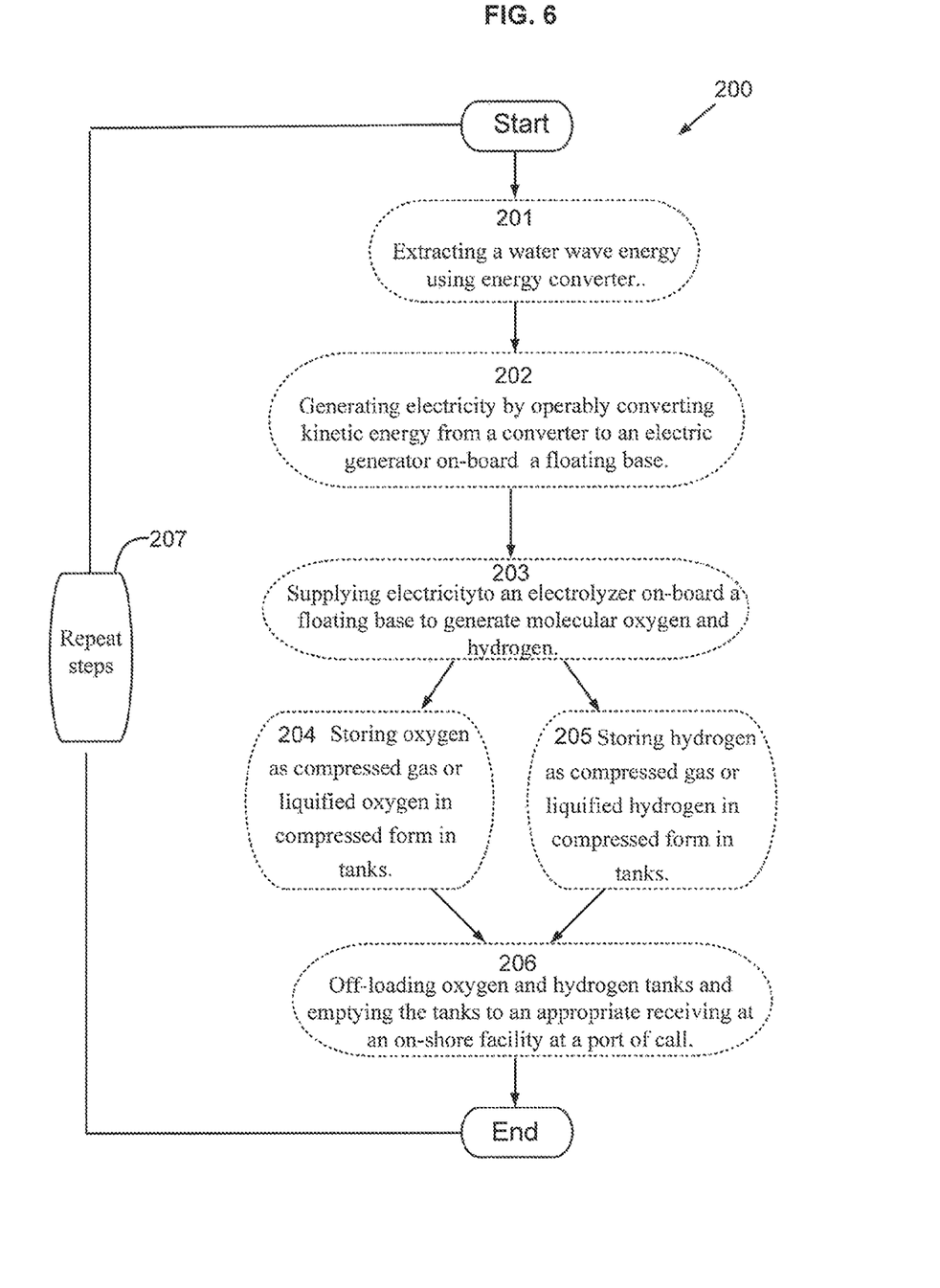
FIG. 6 is a flow chart of generation of oxygen and hydrogen.

FIG. 6 shows a method 200 of extracting energy from ocean water waves comprises: a step 201 of extracting a water wave energy using an energy converter; a step 202 of generating electricity by operably converting kinetic energy from an energy converter to an electric generator on-board a floating base; a step 203 of supplying electricity to an electrolyzer on-board a floating base to generate molecular oxygen and hydrogen; a step 204 of storing oxygen as compressed gas or liquified oxygen in compressed form in tanks; a step 205 of storing hydrogen as compressed gas or liquified hydrogen in compressed form in tanks; a step 206 of off-loading oxygen and hydrogen tanks and emptying the tanks to an appropriate receiving on-shore facility at a port of call; and a step 207 of repeating the above steps, as necessary.

Example 1

Figure 7:
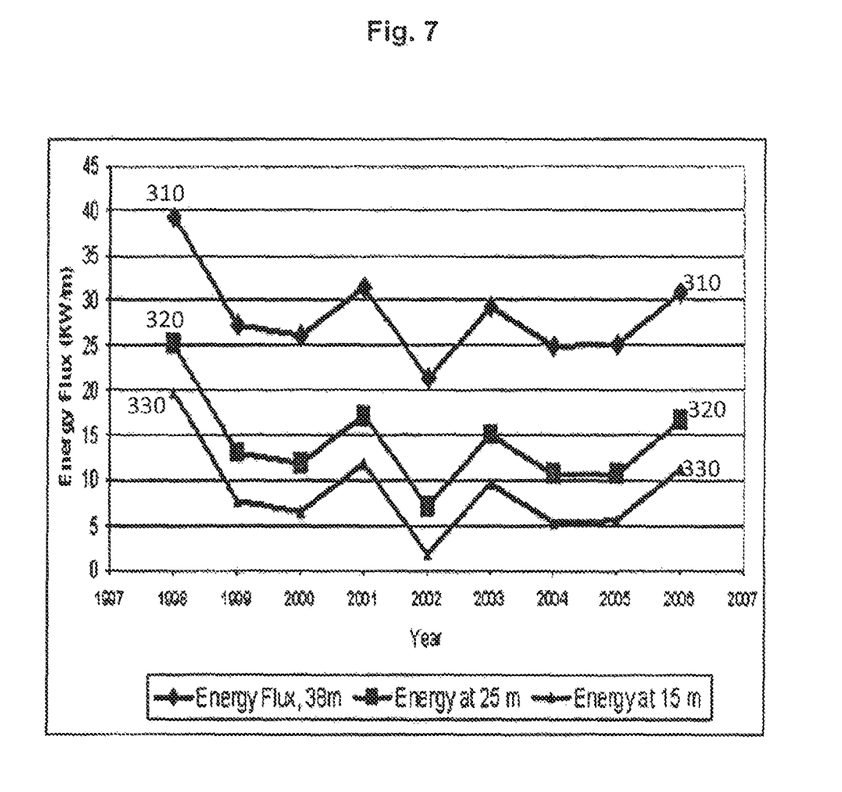
FIG. 7 is an analysis surface energy flux from water waves near a Washington State shore of the Pacific Ocean.

Ocean wave energy dissipates and reduces while propagating from the deep-water area to a near shore zone. For example, FIG. 7 compares 8 years of data (1998-2006, abscissa) of measured water wave power (energy flux, ordinates) at three different off-shore depths: 38 meters (Curve 310), 25 meters (Curve 320), and 15 meters (Curve 330) of open coast along the Pacific Ocean at the entrance to Grays Harbor Estuary (State of Washington, U.S.). The figure shows that while propagating from a depth of 38 meters to a depth of 15 meters, the water wave power reduces by more than 2-fold. A similar trend, i.e., reduction of water wave energy flux will occur at near shore areas where many prior art water wave energy devices may be installed. This means that due to their near shore installation many prior art devices may be at a disadvantage because they may be functioning in an environment of reduced water wave energy. On the other hand, because the instant apparatus may be deployed farther off-shore it may function more efficiently, generating greater power on an annual basis than prior art devices.

Example 2

This example provides an estimate of amount of hydrogen that can be produced by the instant system disclosed herein. The location of the system is assumed to be in the Northwest Pacific, along the State of Washington. The annual mean value of wave power at this region is estimated at approximately 30 KW per linear meter of water wave crest that yields about 250 MWh per year per meter of water wave energy. Assuming that the length of the floating base of the instant system is 100 meters and the instantly disclosed energy converter extracts about 20% of water wave energy, the amount of hydrogen generated is estimated to be approximately 200 tons of hydrogen per year General Comments An advantage of the instant system over prior art energy generation devices is that the instant system provides an energy dampening effect on the floating base giving it greater stability during violent turbulent sea conditions. Up-and-down oscillations of the adjustable weights or electromagnetic plates of the energy converter, occurring at a different phase, amplitude, and frequency than that of the floating base will result in a dampening effect on the floating base. Applying the law of energy conservation, the oscillation energy of the floating base is transferred on to the oscillation energy of the adjustable weights or electromagnetic plates. Larger amplitudes and higher frequencies of oscillation of the adjustable weights in the energy converter will result in greater energy dissipation and smaller oscillation amplitudes and lower oscillation frequencies of the floating base. As a consequence, the system will be more stable and perform more efficiently i.e., produce and store more water wave energy during turbulent sea state conditions. The prior art devices are either not effective under turbulent sea conditions or the prior art devices must be removed to more sheltered areas of the sea. In summary, an advantage of using adjustable suspension springs (or piston-cylinder arrangements) and adjustable weights is the ability of the wave energy converter to efficiently extract wave energy during a wide range of sea state conditions.

The term suspension travel herein refers to the range of movement of the adjustable weights container that is operably coupled to the frame by springs or shock absorbers or the like.

The term phase differential is used herein to refer to the difference in time delay between movement of the floating base when struck by a water wave and the time such an impact transmits into a movement of the adjustable weights container and its suspension from the frame.

The foregoing detailed description has set forth various embodiments of devices or methods via the use of examples and drawings. In so far as such drawings and examples comprise one or more devices, steps or methods, it will be understood by those skilled in the art that each component or device or method or step within such drawing and example can be implemented, individually and/or collectively, by a wide range of any combination thereof. One skilled in the art will recognize that the herein described methods, protocols or devices or steps and objects and the discussion accompanying them are used as examples for the sake of conceptual clarity and that various methods, modifications are within the skill of those in the art. Consequently, as used herein, the specific examples or embodiments set forth and the accompanying comments and observations are intended to be representative of their more general classes. In general, use of any specific exemplar or embodiment herein is also intended to be representative of its class, and the non-inclusion of such specific steps, examples, embodiments or drawings and examples or the like herein shall not be taken as indicating that limitation is desired. The herein described subject matter sometimes illustrates different devices or methods comprised within, or associated with, different or other device(s) or methods. It is to be understood that such described device or methods, drawings and examples are merely exemplary, and that in fact many other drawings, and examples can be implemented, which achieve the same or similar results. In a conceptual sense, any device or method or protocol to achieve the same result is effectively "equivalent" to this disclosure such that the desired result is achieved. Hence, any two or more devices or methods or steps herein combined to achieve a particular result can be seen as "equivalent" to each other such that the desired result is achieved, irrespective of differences in method(s) or steps. Likewise, any two device(s) so equivalent can also be viewed as being "functionally "equivalent", to each other to achieve a desired result, and any two methods or devices capable of being so associated can also be viewed as being capable of acting together, with each other to achieve a desired result.

With respect to the use of substantially any plural and/or singular terms herein, those having skill in the art can transmute from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the embodiments herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" or "has" should be interpreted as "having or has at least," the term "includes" should be interpreted as "includes but is not limited to," etc.). For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions comprising only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

What is claimed is:

1. An apparatus for converting water wave energy into usable electrical energy, said apparatus comprising: a floating base (11) that is floating on a surface of a large body of water having water waves, said floating base moving upward and downward in response to said water waves; said floating base includes an upper surface that is configured and adapted to house more than one large unit of items and a lower surface that is configured and adapted to float on said large body of water without capsizing; a rigid stable frame (32) that is substantially vertically disposed and firmly affixed on to said upper surface of said floating base; a sheave (35) that is substantially vertically operably coupled to a supporting horizontal member (31) of said rigid stable frame, said sheave being configured to vertically rotate (52) around an axis of rotation on a bearing (40); adjustable weights (42), (43) suspended from said horizontal supporting member of said rigid stable frame, said adjustable weights being enclosed in a container (34), said container being operably coupled to said horizontal supporting member of said rigid stable frame by a least one suspension spring (33) capable of contracting and expanding vertically such that said adjustable weights enclosed in said container move up and down along a vertically positioned guide shaft (37) affixed to said upper surface of said floating base; a crank (36) that is operably coupled by one end to said sheave (35) and a second end of said crank being operably coupled to said adjustable weights enclosed in said container (34) such that an up and down movement of said adjustable weights enclosed in said container results in a rotation (52) of said sheave; at least one output shaft (14) that is connected at one end to said sheave (35) and a second end of said at least one output shaft that is operably coupled to at least one gear system (45) such that rotations of said at least one output shaft are converted to generate power from an electric generator (13); and a reservoir (39) containing fluid to replenish and deplete said adjustable weights enclosed in said container, said fluid being pumped using at least one pump (38) into said reservoir through a system of pipes (41), (44) for depleting and replenishing said reservoir containing said fluid.

2. The apparatus of claim 1, wherein said apparatus includes an energy converter (12), said energy converter being enclosed in a housing to protect it from external elements.

3. The apparatus of claim 1, wherein said large body of water having water waves includes an ocean, a sea, a river and a lake.

4. The apparatus of claim 1, wherein said water waves impact said floating base by physical collision of said water waves with said floating base resulting in an upward and downward movement of said adjustable weights in said container.

5. The apparatus of claim 1, wherein said water waves impact said floating base by physical collision of said water waves with said floating base resulting in rotation of said at least one output shaft.

6. The apparatus of claim 1, wherein said at least one suspension spring is selected from a group consisting of a suspender, a gas piston-cylinder arrangement, a hydraulic piston-cylinder arrangement, and a coil spring.

7. The apparatus of claim 1, wherein said adjustable weights are selected from a group consisting of a gravity plate, an electromagnetic plate, a granular material, and a fluid.

8. The apparatus of claim 1, wherein at least one up and down movement of adjustable weights enclosed in said container results in a rotation of said sheave.

9. The apparatus of claim 1, wherein said at least one output shaft is operably coupled to at least one electric generator.

10. The apparatus of claim 1, wherein said at least one output shaft is operably coupled to a system of gears that is operably coupled to at least one electric generator.

11. The apparatus of claim 1, wherein said at least one output shaft rotates to effectively generate at least one unit of electrical energy.

12. A method (100), (200) of extracting energy from water waves with the apparatus of claim 1, said method comprising: locating (101) the floating base within confines of the large body of water; adjusting and tuning (102) at least one suspension spring, said at least one suspension spring being operably coupled to the adjustable weights enclosed in the container; attaching one end of said at least one spring to the horizontal supporting member of the rigid frame and attaching a second end of said at least one spring to said container having said adjustable weights; transferring (103) energy from undulatory floatation motions of said floating base into movements of said adjustable weights in said container; converting (104) a kinetic energy of said movements of said adjustable weights into electricity; extracting (201) water wave energy using an energy converter; generating (202) electricity by operably converting a kinetic energy from a converter to an electric generator on-board said floating base; supplying (203) electricity to an electrolyzer on-board said floating base to generate molecular oxygen and hydrogen; storing (204) oxygen as compressed gas or liquified oxygen in compressed form in tanks; storing (205) hydrogen as compressed gas or liquified hydrogen in compressed form in tanks; off-loading (206) said oxygen and said hydrogen tanks and emptying said tanks to an appropriate receiving on-shore facility at a port of call; and repeating (207) the above steps as appropriate.

13. The method of claim 12, wherein said at least one suspension spring is selected from a group consisting of a suspender, a gas shock absorber, a hydraulic piston-cylinder, and a coil spring.

14. The method of claim 12, wherein said adjustable weights are selected from a group consisting of a gravity plate, an electromagnetic plate, a grain and a fluid.

15. The method of claim 12, wherein said adjustable weights enclosed in said container that is operably coupled to said at least one suspension spring includes a suspension travel that is in response to a motion of said water waves.

16. A system for generating energy from water waves and storage of said energy therefrom in a form of hydrogen, said system comprising: the apparatus of claim 1, wherein said floating base houses at least one water wave energy converter (12), at least the electric generator (13), at least one DC to AC inverter (16); at least one electrolyzer (15), at least one compressor (17), (21) for compressing oxygen and hydrogen gases, and at least one storage tank (19), (23) to store compressed liquified hydrogen and oxygen.

17. The system of claim 16, wherein said at least one water wave energy converter is operably coupled by at least one output shaft to said at least one electric generator through a system of gears.

18. The system of claim 16, wherein said at least one electric generator is connected by a system of electrical wires and cables to said at least one electrolyzer.

19. The system of claim 16, wherein said at least one electrolyzer is connected by a system of electrical wires cables, and pipes to said at least one compressor.

20. The system of claim 16, wherein said at least one compressor is connected by a system of electrical wires cables, and pipes to at least one storage tank for storing oxygen and hydrogen.

* * * * *